(12) United States Patent
Campbell

(10) Patent No.: US 7,188,602 B1
(45) Date of Patent: Mar. 13, 2007

(54) CONCENTRIC INTERNAL COMBUSTION ROTARY ENGINE

(75) Inventor: Robert L. Campbell, Hesperia, CA (US)

(73) Assignee: CLR, LLC, Hesperia, CA (US)

( * ) Notice: Subject to any disclaimer, the term of this patent is extended or adjusted under 35 U.S.C. 154(b) by 0 days.

(21) Appl. No.: 11/177,175

(22) Filed: Jul. 8, 2005

Related U.S. Application Data

(60) Provisional application No. 60/587,948, filed on Jul. 14, 2004.

(51) Int. Cl.
*F02B 53/00* (2006.01)
*F01C 1/00* (2006.01)
*F04C 18/00* (2006.01)
*F04C 2/00* (2006.01)

(52) U.S. Cl. ............... 123/246; 123/245; 123/241; 418/227

(58) Field of Classification Search .......... 123/246, 123/241, 245, 203, 232, 234; 418/140, 227, 418/259, 266–268
See application file for complete search history.

(56) References Cited

U.S. PATENT DOCUMENTS

| | | | | |
|---|---|---|---|---|
| 1,279,912 A * | 9/1918 | Roberts | ............... | 418/227 |
| 2,136,066 A * | 11/1938 | Walters et al. | ........... | 418/227 |
| 2,947,290 A * | 8/1960 | Froede | ............... | 123/203 |
| 3,207,425 A * | 9/1965 | Morse | ............... | 123/246 |
| 3,260,248 A * | 7/1966 | Lyle | ............... | 123/232 |
| 3,322,103 A * | 5/1967 | Dirnberger | ............ | 418/227 |
| 3,439,654 A * | 4/1969 | Campbell, Jr. | ........ | 123/246 |
| 3,582,246 A * | 6/1971 | Traut et al. | ........... | 418/264 |
| 3,807,368 A * | 4/1974 | Johnson | ............. | 123/245 |
| 3,822,676 A * | 7/1974 | Richter | .............. | 123/236 |
| 3,850,150 A * | 11/1974 | Plevyak | ............. | 123/246 |
| 3,972,661 A * | 8/1976 | Herzner | ............. | 418/262 |
| 4,373,484 A * | 2/1983 | Boehling | ............ | 123/241 |
| 4,481,920 A * | 11/1984 | Carr et al. | ........... | 123/246 |
| 4,726,240 A | 2/1988 | Brems | ................. | 74/27 |
| 5,819,699 A * | 10/1998 | Burns | ................ | 123/234 |
| 6,955,153 B1 * | 10/2005 | Peitzke et al. | ........ | 123/241 |
| 2005/0005898 A1 | 1/2005 | Horstin | .............. | 123/236 |

FOREIGN PATENT DOCUMENTS

GB 2094403 A * 9/1982

\* cited by examiner

*Primary Examiner*—Thai-Ba Trieu
(74) *Attorney, Agent, or Firm*—Fitzpatrick, Cella, Harper & Scinto

(57) ABSTRACT

An internal combustion rotary engine includes a housing having an inlet and an outlet and a rotatable rotor centrally mounted within the housing. The rotor includes a plurality of pockets located about its circumference, the rotor further being connected to a rotor shaft. A rotatable elliptical body is disposed in each of the plurality of pockets. Each rotatable elliptical body is coupled to respective planet gears and each respective planet gear is meshed with a centrally disposed fixed sun gear. An ignition source is disposed in each of the plurality of pockets for igniting a fuel/air mixture. During operation of the internal combustion rotary engine, for each 360° rotation of the rotor, each elliptical body rotates through 720°.

20 Claims, 10 Drawing Sheets

Section A-A

CONCENTRIC INTERNAL COMBUSTION ROTARY ENGINE

REFERENCE TO RELATED APPLICATIONS

This Application claims priority to U.S. Provisional Patent Application No. 60/587,948 filed on Jul. 14, 2004. The '948 Application is incorporated by reference as if set forth fully herein.

FIELD OF THE INVENTION

The field of the invention generally relates to combustion engines. More specifically, the field of the invention relates to internal combustion rotary engines.

BACKGROUND OF THE INVENTION

Combustion engines that operate using a reciprocating piston suffer from a number of disadvantages. First and foremost is the inefficient manner in which components such as, for example, pistons are repeatedly accelerated, stopped, and reversed during operation of the engine. In this regard, conventional piston-based engines are both unbalanced and inefficient due to the constant momentum changes occurring within the engine. It has been estimated, for example, that about 13% of fuel energy is lost in a conventional piston-based engine due to internal friction and pumping losses.

In addition, in conventional piston-based engines, there is only a brief moment (if at all) when the torque arm is in its optimum configuration with the piston/connecting rod. This typically occurs a few degrees before the middle of the piston stroke. In fact, a true 90° (optimal) torque arm is never achieved in a conventional piston-based combustion engine.

The internal combustion rotary engine is one alternative to piston-based combustion engines which can mitigate, to some extent, these inherent inefficiencies. Felix Wankel is credited with inventing an internal combustion rotary engine which operates by using a triangular-shaped rotor spinning within a housing shaped in the manner of a epitrochoid (e.g., peanut-shaped). The internal combustion rotary engine includes a number of advantages over piston-based combustion engines.

First, internal combustion rotary engines are more lightweight and compact. Second, internal combustion rotary engines are smoother since there is no reciprocating motion of pistons. Third, internal combustion rotary engines have an extended power stroke rotation of the output shaft as compared to their piston-based counterparts. Fourth, there are fewer moving parts, e.g., no valves, connecting rods, cams, and timing chains. Timing of the intake and exhaust strokes are accomplished directly by the motion of the rotor. Fifth, internal combustion rotary engines have a generally flat torque curve because no valves are used. Sixth, combustion in internal combustion rotary engines are generally cooler than their piston-based counterparts. This means fewer oxides of nitrogen are created. Finally, internal combustion rotary engines separate the combustion region from the intake region, thereby making these engines good candidates for hydrogen fuel-based engines.

The problem with Wankel-type internal combustion rotary engines is that they generally leak combustion gases, making these types of engines less desirable. In addition, the rotational speed (i.e., revolutions per minute (RPM)) of Wankel-type internal combustion rotary engines is limited because of the manner in which the triangular rotor flip-flops around the interior of the epitrochoid housing.

There thus is a need for a true internal combustion rotary engine that is not limited in its rotational speed. In addition, there is a need for an internal combustion rotary engine that has very low emissions. In addition, there is a need for an internal combustion rotary engine that has high horsepower and high torque while at the same time is fuel efficient.

SUMMARY OF THE INVENTION

An internal combustion rotary engine includes a housing having an inlet and an outlet and a rotatable rotor centrally mounted within the housing. The rotor includes a plurality of pockets located about its circumference. The rotor is further connected to a rotor shaft that is mechanically connected to an output shaft. A rotatable elliptical body is disposed in each of the plurality of pockets. Each rotatable elliptical body is coupled to respective planet gears. Each of the respective planet gears is meshed with a centrally disposed fixed sun gear. In addition, an ignition source is disposed in each of the plurality of pockets. For each 360° rotation of the rotor, each elliptical body rotates through 720°. The rotary engine includes four separate regions in which the intake, compression, power, and exhaust strokes take place.

In one aspect of the invention, the rotor includes three pockets located about its circumference. The pockets may be equally spaced about the circumference of the rotor.

In another aspect of the invention, an internal combustion rotary engine includes a housing having an inlet and an outlet, the inlet being coupled to a compressor. A rotatable rotor is centrally mounted within the housing. The rotor includes a plurality of pockets located about its circumference. The rotor is connected to a rotor shaft, which in turn, is coupled to an output shaft. An elliptical body is disposed in each of the plurality of pockets with each elliptical body being mounted on a rotational shaft at one end and coupled at an opposing end to a planetary gear. Each planet gear is engages with a fixed, centrally located fixed sun gear. An ignition source is disposed in each of the plurality of pockets. For each full rotation of the rotor (i.e., 360°) each elliptical body rotates through 720°.

In another aspect of the invention, each elliptical body includes a seal disposed on an exterior surface thereof. In still another aspect of the invention, the elliptical body is interposed between two outer spools to form an elliptical body assembly. In yet another aspect of the invention, the rotor is coupled to a distributor. The distributor rotates with the rotor and includes an electrical contact for each ignition source (e.g., three electrical contacts).

In another aspect of the invention, the rotor shaft includes a passageway or bore therein in fluid communication with a bore in the rotational shaft of the elliptical body assembly. The passageway and bore provide an access path for oil or other lubricant to lubricate the elliptical body bearings, and the planetary and sun gears. In one preferred aspect of the invention, each planet gear has a pitch diameter that is equal to the pitch diameter of the sun gear.

It is an object of the invention to provide an internal combustion rotary engine that has high horsepower, very high torque, and very low emissions. It is a further object of the invention to provide an internal combustion rotary engine that is balanced and uses a rotor that rotates about a single axis. It is yet another object of the invention to provide an internal combustion rotary engine that uses a concentrically balanced rotor.

BRIEF DESCRIPTION OF THE DRAWINGS

FIG. 7 illustrates a compressor interposed between the center plate and the gear box.

DETAILED DESCRIPTION OF THE PREFERRED EMBODIMENTS

Figure 1:
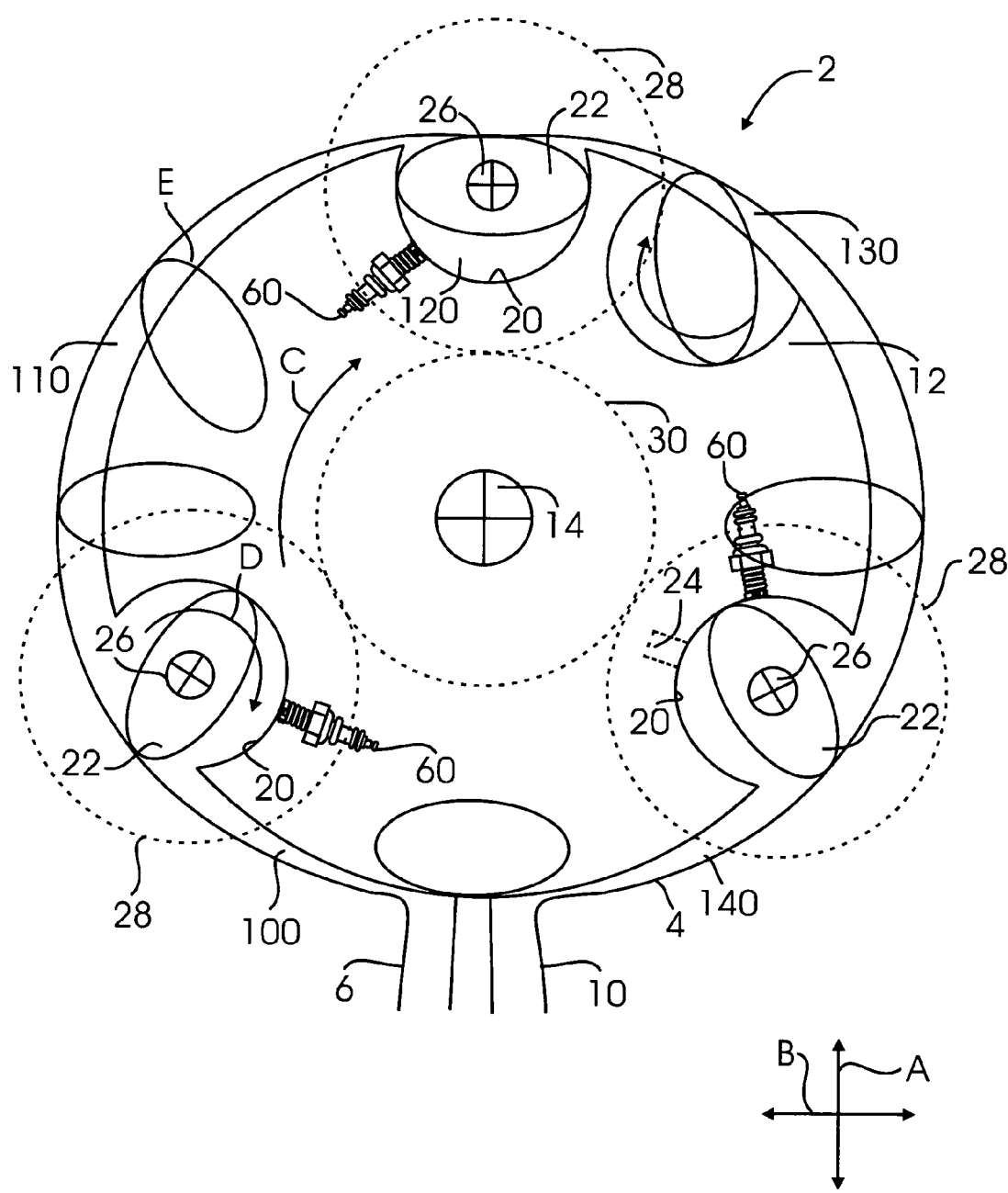
FIG. 1 illustrates a rotor contained within a housing of an internal combustion rotary engine according to one preferred embodiment of the invention. The engine housing is open to expose the rotor, the three pockets, and the three elliptical bodies.
Figure 2:
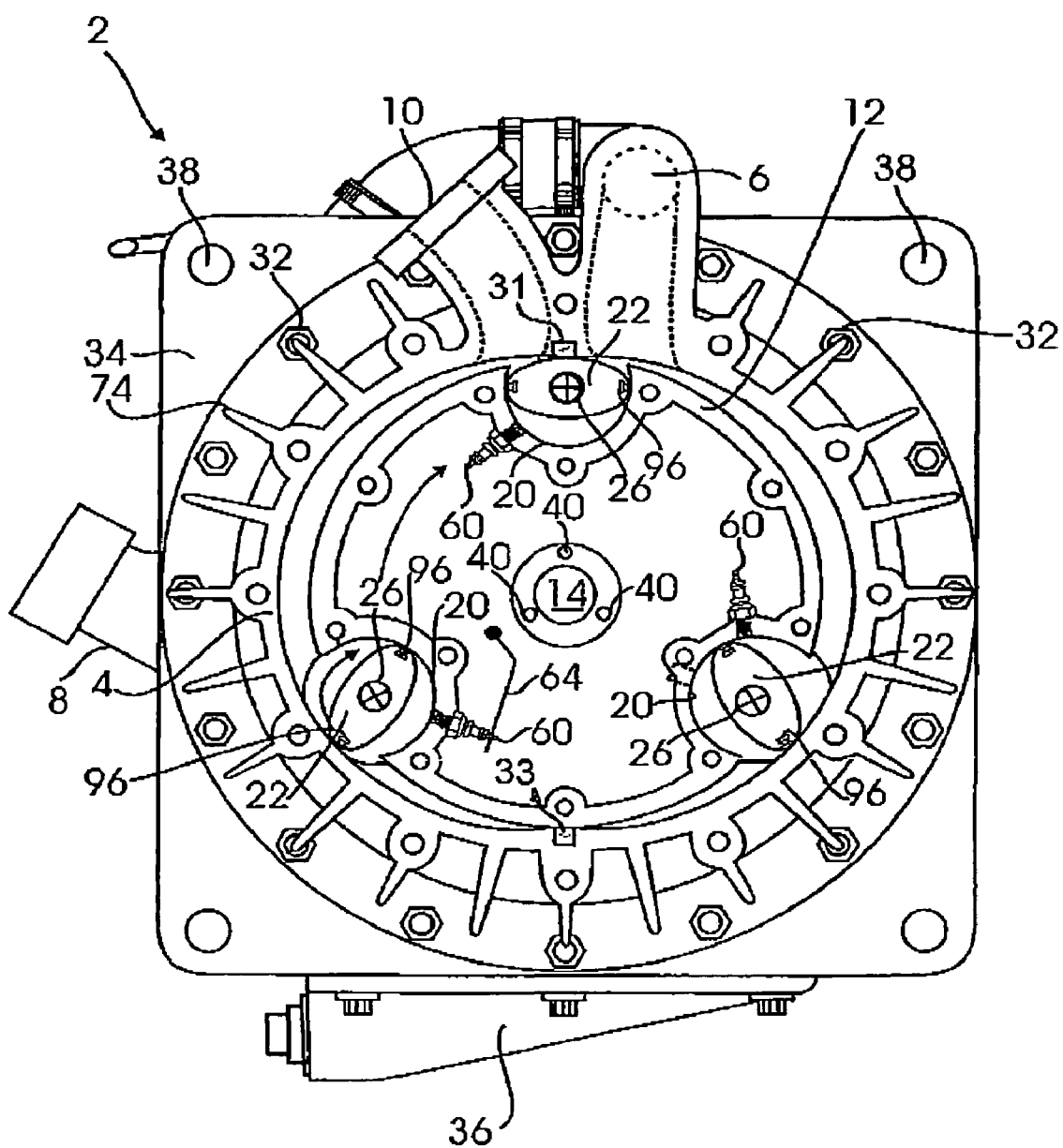
FIG. 2 illustrates an internal combustion rotary engine with the rotor being exposed.
Figure 7:
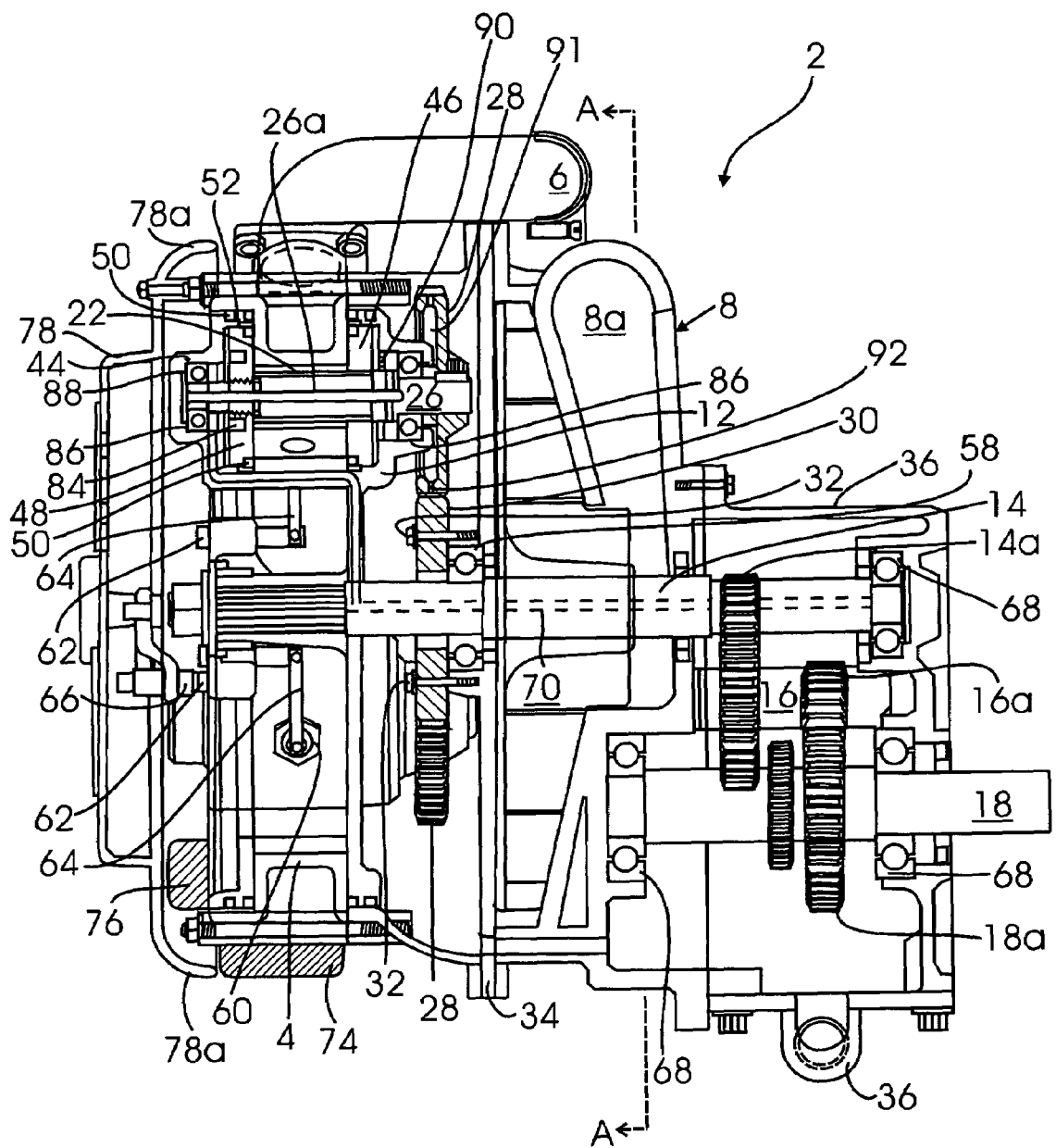
FIG. 7 illustrates a sectional view of the engine according to one preferred aspect of the invention.
Figure 8:
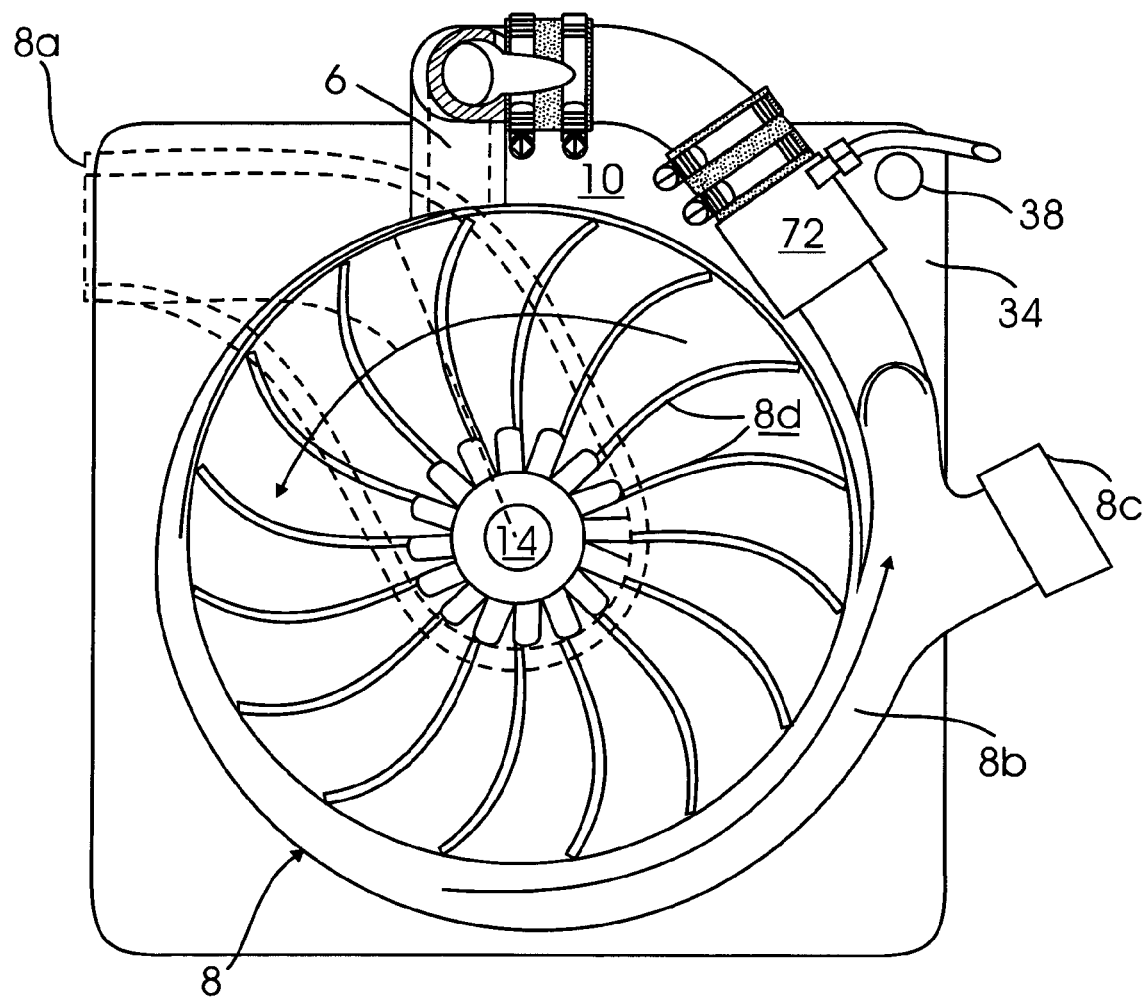
FIG. 8 illustrates a front view of the centrifugal compressor impeller taken along the line A—A in FIG. 7.

FIGS. 1 and 2 illustrates an internal combustion rotary engine 2 according to a preferred embodiment of the invention. The internal combustion rotary engine 2 includes a housing 4 which is generally oblong-shaped having a minor axis (the distance between the top and bottom portions of the housing 4 in the direction of arrow A shown in FIG. 1) and major axis (the distance between the left and right portions of the housing 4 in the direction of arrow B shown in FIG. 1). The housing 4 includes an inlet 6 which serves as the inlet for the fuel/air mixture which is combusted inside the engine 2. The inlet 6 may be coupled to an optional compressor 8, for example, as illustrated in FIGS. 7 and 8. The housing 4 further includes an outlet 10 which serves to exhaust combustion gases/air outside of the engine 2. In one aspect of the invention, the housing 4, when viewed in cross-section, has a profile of a spline curve.

A rotatable rotor 12 is disposed centrally inside the housing 4. The rotor 12 is mounted on a rotor shaft 14 and is rotatable within the housing 4 in the direction of arrow C in FIG. 1. The rotor shaft 14 is mechanically connected through appropriate gearing, for example, through a jackshaft 16, to an output shaft 18 (shown e.g., in FIGS. 6 and 7). The rotatable rotor 12 further includes a plurality of pockets 20 located about the rotor's circumference. The pockets 20 generally comprise a hemispherical or semi-hemispherical cavity within the rotor 12. In one aspect of the invention the rotor 12 includes two pockets 20. Preferably, however, there are three pockets 20 as is shown in FIGS. 1 and 2. The three pockets 20 are spaced equidistant from one another (e.g., 120° spacing). As explained below, the pockets 20, working in connection with associated rotatable elliptical bodies 22, increase and decrease the displacement volume as the rotor 12 rotates around rotor shaft 14. The displacement volume is formed between an outer surface of the rotor 12 as well as the volume of the pockets 20 and the inner surface of the housing 4.

FIG. 1 shows that an optional purge port 24 may be incorporated into the pockets 20. The air purge port 24 is used to aid in expelling spent combustion gases from the pocket 20. It should be understood, however, that the air purge port 24 is entirely optionally and may be omitted entirely.

As seen in FIGS. 1 and 2, the elliptical bodies 22 are affixed to a rotational shaft 26. The rotational shaft 26 of each elliptical body 22 is connected to a planetary gear 28 (shown in dashed lines in FIG. 1 and also shown in FIGS. 3A and 3B). Each planetary gear 28 is meshed with a centralized, fixed sun gear 30 (shown in dashed lines in FIG. 1 and also seen in FIGS. 3A and 3B). The planetary gears 28 thus orbit the centralized, fixed sun gear 30 during operation of the engine 2. Preferably, the planetary gears 28 and the centralized, fixed sun gear 30 have the same pitch diameter and have a multiple of two (2) teeth as well as a multiple of three (3) teeth (e.g., 12, 18, 24, 30, etc. teeth).

During operation of the engine 2, the elliptical bodies 22 rotate in the direction of arrow D in FIG. 1, namely, the same direction as the rotation of the rotor 12 (arrow C in FIG. 1.). Preferably, the planetary gears 28 and sun gear 30 are geared such that the elliptical bodies 22 rotate at twice the rate (2:1) of the rotor 12. More specifically, in a preferred aspect of the invention, when the rotor 12 rotates through 360°, the elliptical bodies 22 rotate through 720°. Other rotation ratios, however, can also be used in connection with the engine 2. FIG. 1 also illustrates the outline E of an elliptical body 22 as it travels within the housing 4.

FIG. 2 illustrates an open rotor 12 bolted through a series of bolts 32 through a center plate 34 and gear box 36 (see also FIG. 7). As seen in FIG. 2, the center plate 34 includes a plurality of engine mounting holes 38. FIG. 2 further illustrates three distributor mount holes 40 for securing distributor 42 (described in more detail below).

In one preferred aspect of the invention, the elliptical bodies 22 are formed from industrial ceramic materials although other materials such as metals and alloys can also be used. Preferably, the elliptical bodies 22 are machined or otherwise formed with strict tolerances in order to minimize any leakage of air and/or fuel between the elliptical bodies 22 and the interior of the housing 4. In addition, the elliptical bodies 22 are preferably sealed inside the pockets 20, for example, via seals 96.

Figure 3A:
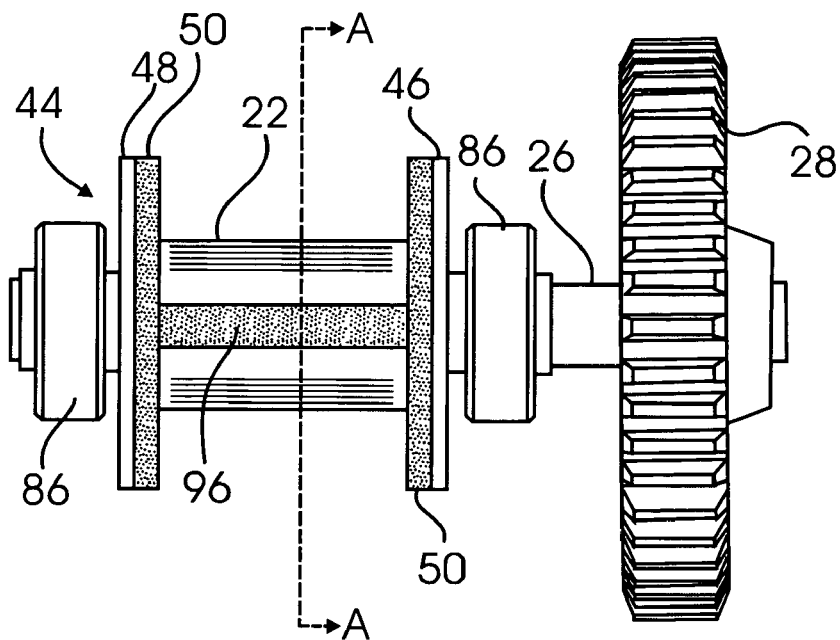
FIG. 3A illustrates a top down view of the ellipse body assembly. The rotational shaft of the ellipse body assembly is shown coupled to a planetary gear.
Figure 3B:
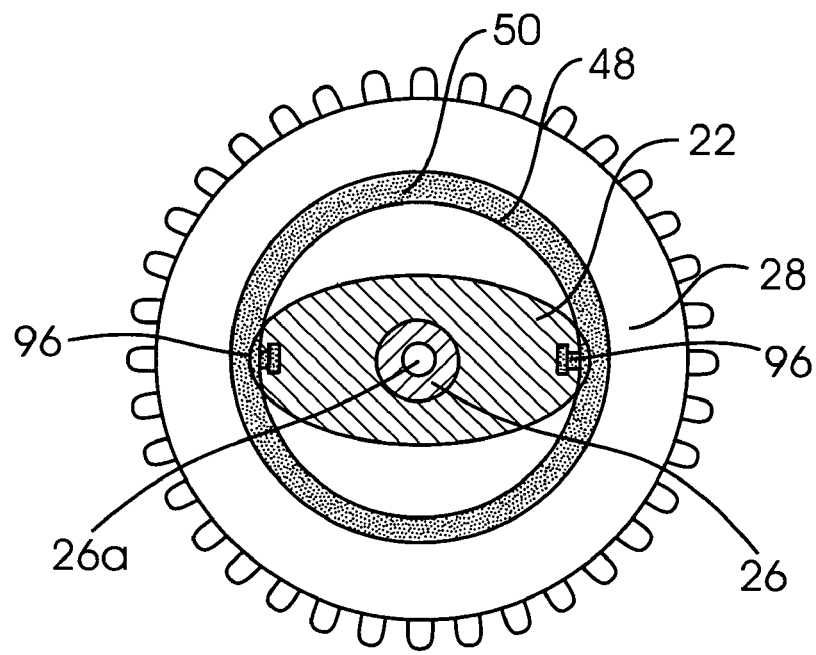
FIG. 3B illustrates an end view of a ellipse body assembly taken along the line A—A in FIG. 3A. The assembly includes a circular end or spool containing a seal around a circumferential surface thereof. An elliptical body is supported on a rotational shaft. The coupled planetary gear is also shown.
Figure 10A:
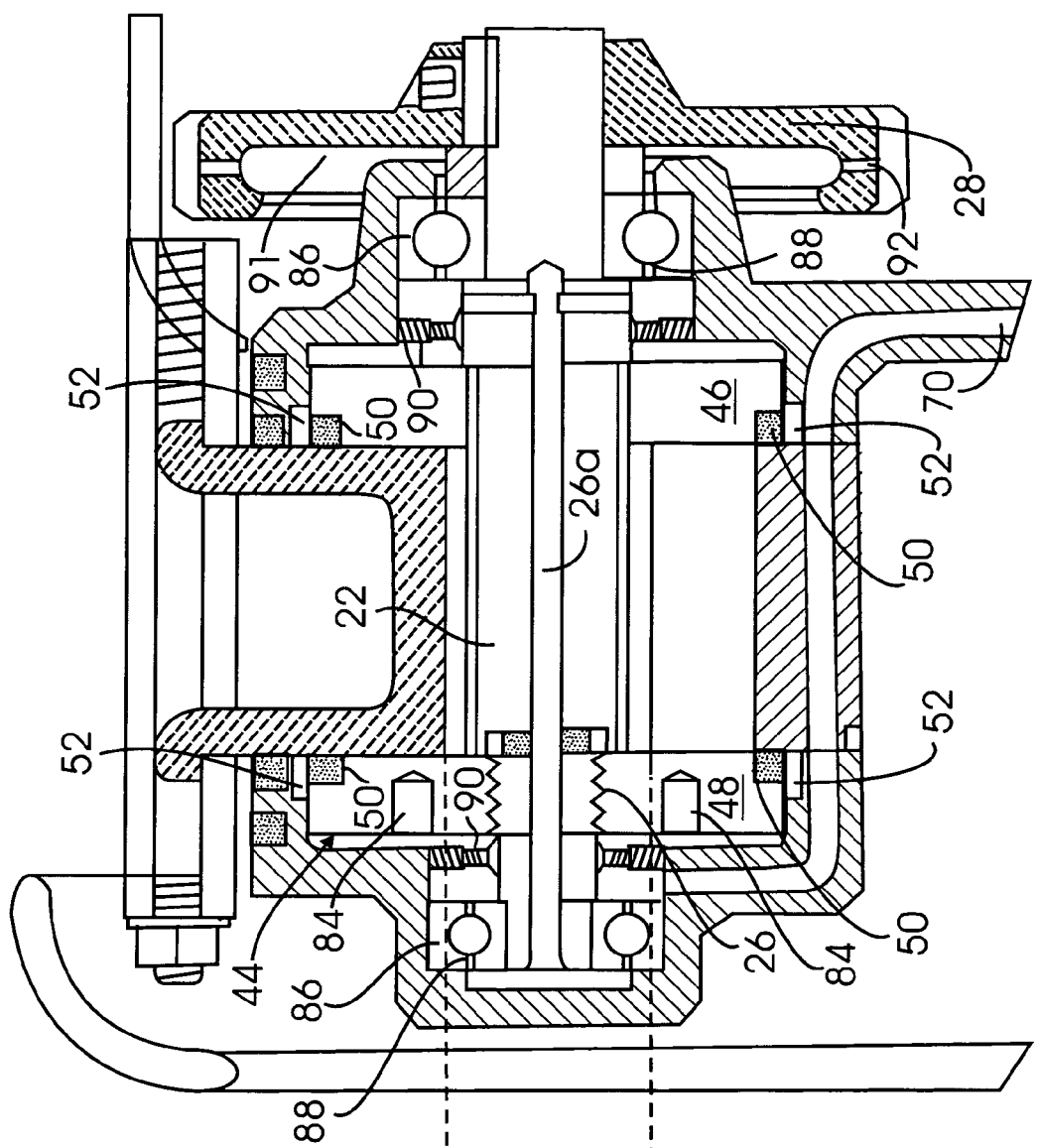
FIG. 10A illustrates a magnified sectional view of an elliptical body assembly contained in a pocket formed between the rotor and housing.

With reference now to FIGS. 3A and 3B, in one aspect of the invention, the elliptical body 22 is contained in an elliptical body assembly 44 that includes two circular ends 46, 48 or spools. The circumference of each end 46, 48 may include a seal 50 for forming a combustion seal within each respective pocket 20. An optional wearing surface 52 for the seals 50, such as hardened steel, as is shown in FIG. 10A, may be provided within the rotor 12. The seals 50 keep the fuel/air/combustion gases contained within the pocket 20 and/or housing 4. Still referring to FIGS. 3A and 3B, each elliptical body 22 also includes a rotational shaft 26 on which the elliptical body 22 is mounted.

Figure 4:
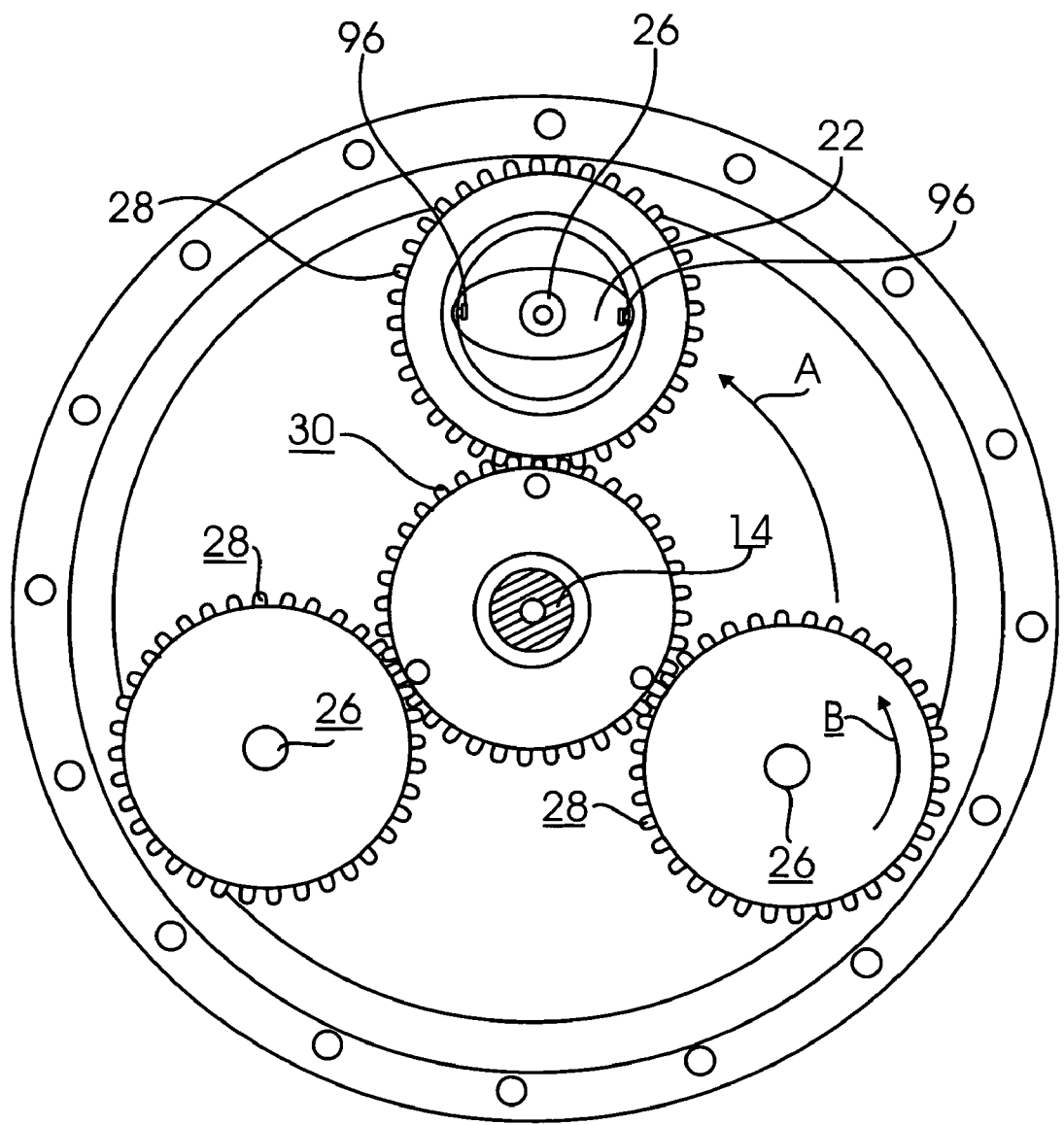
FIG. 4 illustrates the centralized sun gear and surrounding planetary gears. The rotational direction of the planetary gears is shown by arrows A and B. A single ellipse body assembly is also illustrated.

FIG. 4 illustrates fixed sun gear 30 and surrounding planetary gears 28. The fixed sun gear 30 may be affixed to the center plate 34 (shown in FIG. 2) through, for example, a plurality of bolts 32 (as shown in FIG. 7). The three planetary gears 28 are equally spaced about the central sun gear 30 (separated by 120°) and are affixed, respectively, to the ends of the rotational shafts 26 of each elliptical body 22. The rotor shaft 14 passes through the central sun gear 30 and may be rotationally held via a rotatable bearing 58 or the like (as is shown in FIG. 7). As seen in FIGS. 4 and 7, the rotor shaft 14 continues into the gear box 36 and is mechanically coupled through a jackshaft 16 to an output shaft 18.

Figure 5:
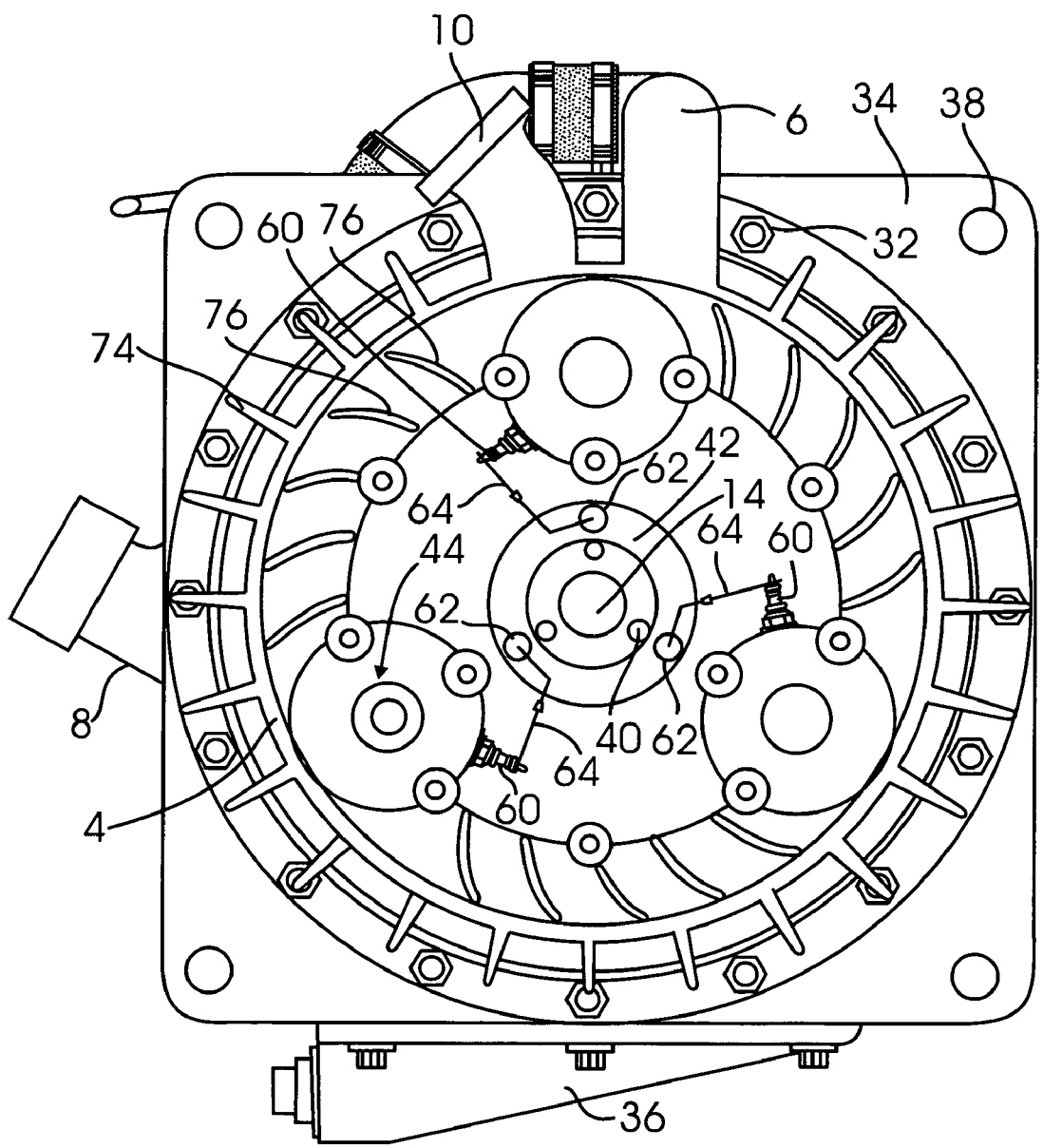
FIG. 5 illustrates a rotor showing the sparkplugs connected to a central distributor.

Referring to FIGS. 1, 2, and 5 an ignition source 60 is preferably associated with each pocket 20 in the rotor 12. As shown in FIGS. 1 and 2, the ignition source 60 is preferably a sparkplug. In order to fire the ignition sources 60, a conventional distributor-type structure is used to fire the individual ignition sources. FIG. 5, for example, illustrates how each ignition source 60 is connected to a centralized, electrically conductive distributor 42. In this regard, no wires are directly connected to the individual sparkplugs 60. The distributor 42 is mounted directly on the rotor 12 via distributor mounting holes 40 as shown in FIG. 2. As best seen in FIG. 5, distributor 42 includes three contact points 62 (such as high voltage electrical pick-ups) that are electrically connected to a respective ignition source 60 via a rigid conductor member 64 (e.g., rigid spark plug strap). During operation of the engine 2, the distributor 42 rotates about the rotor shaft 14. As best seen in FIG. 7, a stationary electrical contact member 66 is provided at a point about the rotational circumference circumscribed by the contact points 62. The stationary contact member 66 is positioned such that it electrically engages with one of the three contact points 62 as the distributor 42 is rotated about its axis. In this regard, electrical contact is made between the source of electricity (e.g., a high voltage source) and the respective ignition sources 60 as the rotor 12 and distributor 42 rotate about the rotor shaft 14. The electrical contact causes the ignition source 60 to fire, thereby initiating the combustion process in one of the three pockets 20 to provide the motive force to the rotor 12.

Figure 6:
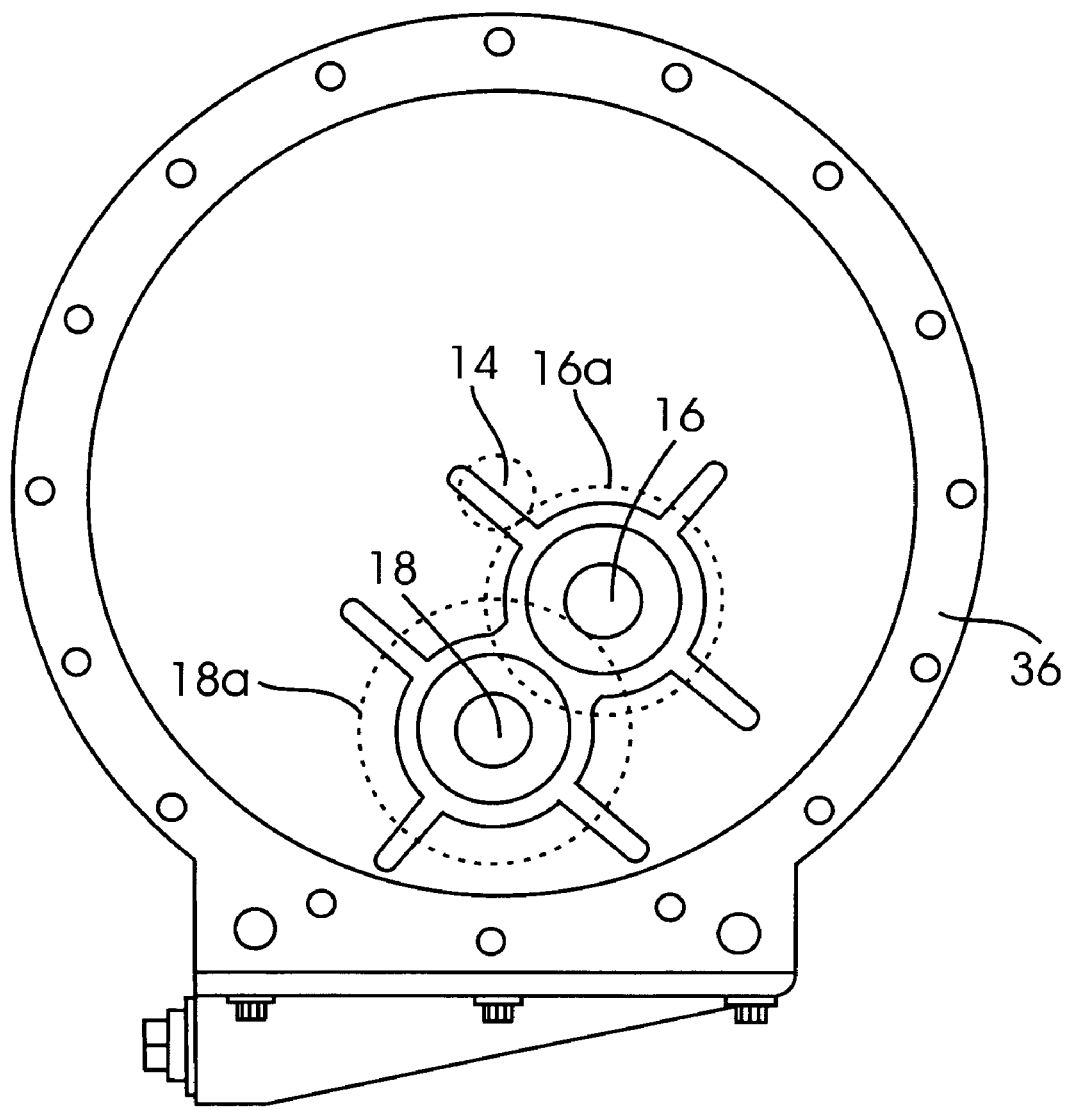
FIG. 6 illustrates a gearbox and reduction gears illustrating the mechanically coupled rotor shaft, jackshaft, and output shaft.

FIGS. 6 and 7 illustrate the interior of the gear box 36. The rotor shaft 14 includes a splined or meshed portion 14*a* that engages with splined or meshed portion 16*a* of a jack shaft 16. The jack shaft 16 is in turn, coupled to a splined or meshed portion 18*a* of an output shaft 18. The gearing of the rotor shaft 14 serves to reduce the rotational speed of the output shaft 18 compared to the rotational speed of the rotor shaft 14. For example, a reduction of around 8:1 may be needed to reduce the rotational rate from turbine speeds to lower rotational speeds generally used for motor vehicles, boats, or airplanes.

FIG. 7 illustrates a sectional view of an engine 2 according to one preferred embodiment of the invention. The gear box 36 contains a series of bearings 68 or other rotational supports for holding the rotor shaft 14, jack shaft 16, and output shaft 18. A passageway 70 within the rotor shaft 14 may be provided to lubricate the rotational elliptical body bearings 86. The rotational shaft 26 of the elliptical body assembly 44 may include a bored shaft 26*a* that communicates with the passageway 70. In this regard, oil passing through the passageway 70 and bored shaft 26*a* may act as a bearing oil return that lubes the elliptical bodies 22 and/or gears 28, 30.

Referring back to FIG. 1, the engine 2 generally includes five regions 100, 110, 120, 130 and 140 that correspond to the four cycles of a four stroke engine. Region 100, which is regarded as the intake stroke, is generally bounded by space between the inlet 6 and a portion of the space formed within the lower leftmost pocket 20. Region 110, which is regarded at the compression stroke of the engine 2, is generally bounded by the space between the lower leftmost pocket 20 and a small portion of the top dead-center pocket 20. Region 120, which is bounded by the space between the elliptical body 22 and the pocket 20, is regarded as the combustion chamber. Region 130, which is regarded as the power stroke, is generally bounded by space between the top dead-center pocket 20 and the lower rightmost pocket 20. Region 140, which is regarded as the exhaust stroke, is generally bounded by the space between the lower rightmost pocket 20 and the exhaust outlet 10.

Referring to FIGS. 7 and 8, a compressor 8 is interposed between the center plate 34 and the gear box 36. The compressor 8 is affixed to the rotor shaft 14 and includes an intake 8*a*, an output 8*b*, and a waste gas outlet 8*c* (best seen in FIG. 8). Rotation of the rotor shaft 14 rotates a plurality of vanes 8*d* within the compressor 8 to compress air into the inlet 6 of the engine 2. As seen in FIG. 8, a fuel injector 72 is disposed inline between the compressor output 8*b* and the engine inlet 6. The compressor 8 is able to increase the compression ratio of the engine 2.

For example, in an engine 2 having a rotor 12 with a diameter of 15.5 inches, elliptical bodies having dimensions of 3 inches by 1.5 inches, planetary gears of 7 inch diameter, the engine is able to achieve a compression ratio of about 10.58. The compressor 8 is able to double the compression ratio of engine 2 from about 5.29 to about 10.58.

Figure 9:
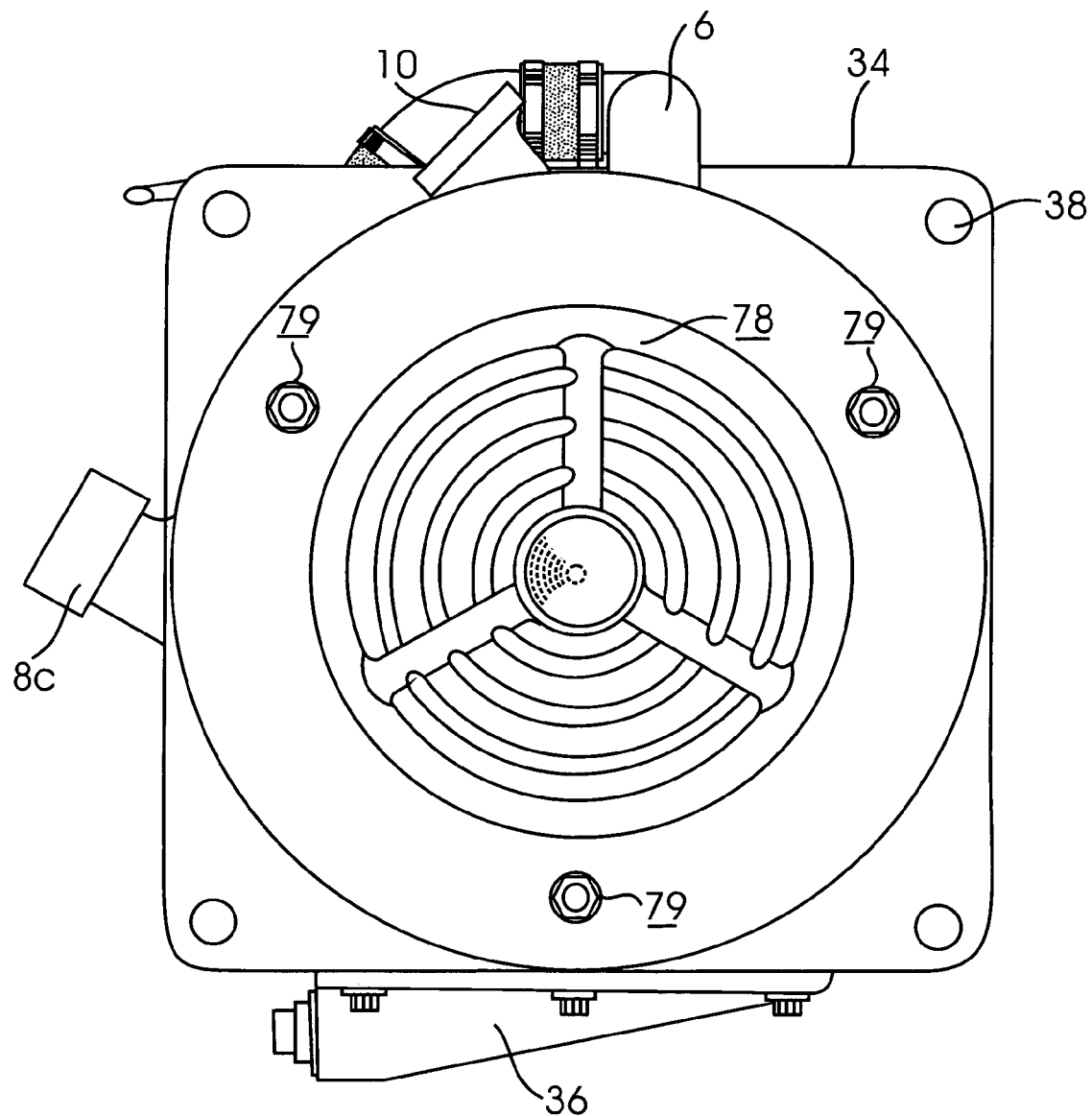
FIG. 9 illustrates an end view of the engine illustrating the enclosed rotor.

Referring to FIGS. 2, 5, and 7 the housing 4 of the engine 2 includes a plurality of fins 74 for cooling the engine 2. The fins 74 may be made of a heat conducting metal such as, for example aluminum. In addition, as best seen in FIGS. 5 and 7, the rotor 12 includes a plurality of fan blades 76. The fan blades 76 may include an arcuate or toroidal shape and are used to generate airflow to cool the engine 2 during operation. Referring to FIGS. 7 and 9, a rotor cap 78 is affixed to the engine 2 via a plurality of bolts 79. The rotor cap 78 is preferably formed as a single piece and includes air redirect portions 78*a* to direct the airflow created by the fan blades 76 across the surface of the plurality of fins 74. The rotor cap 78 also serves to secure the stationary electrical contact member 66.

Figure 10B:
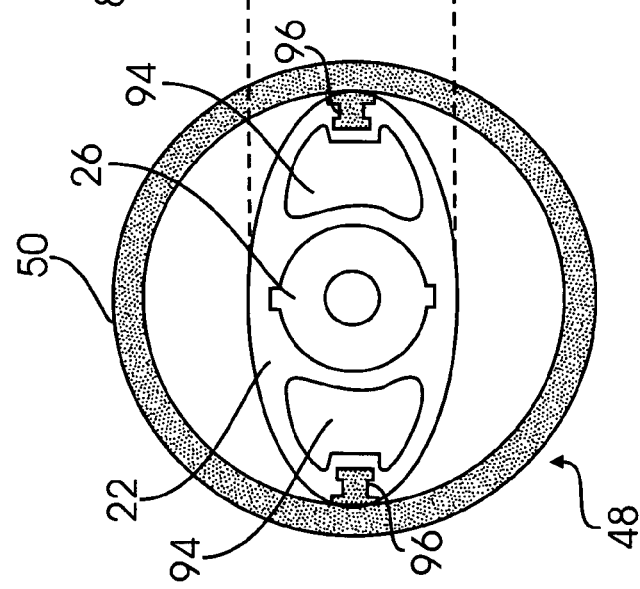
FIG. 10B illustrates an end view of an elliptical body according to one aspect of the invention.

With reference not to FIGS. 3A, 3B, 7, 10A and 10B, in one aspect of the invention the elliptical body assembly 44 includes a partially threaded rotational shaft 26 (as shown in FIGS. 7 and 10A). In this regard, the elliptical body assembly 44 may be readily assembled and disassembled, for example, to replace the seals 50 or elliptical bodies 22. For example, the elliptical body assembly 44 may be formed by inserting a first spool 46 on the rotational shaft 26. The elliptical body 22 can then be feed onto the rotational shaft 26. The receiving hole of the elliptical body 22 may be keyed, as is shown in FIG. 10B, to properly orient the elliptical body 22 within the assembly 44. The second spool 48 may then be placed over the rotational shaft 26. The second spool 48 may include a plurality of recesses 84 for receiving a tool (not shown) that is used to tighten (or loosen) the second spool 48. For example, the recesses 84 may be formed to accept wrench or spanner pins. The elliptical body 22 is thus sandwiched between the first and second spools 46, 48.

As best seen in FIGS. 3A and 10A, the rotational shaft 26 is rotatable within two body bearings 86. In one aspect of the invention, the oil passageway 70 in the rotor shaft 14 is coupled to lubrication spaces 88 for the two body bearings 86. Oil is thus able to pass through the oil passageway 70 into the outer body bearing 86, through the bored shaft 26a, and into the interior body bearing 86. Oil seals 90 are provided to seal the body bearings 86 from the interior (i.e., combustion regions) of the rotor 12.

Still referring to FIG. 10A, the lubrication space 88 of the inner body bearing 86 communicates with a plenum or space 91 within the planetary gear 28. The planetary gear 28 may be a cupped planetary gear 28 to reduce overhang and provide gear lubrication. One or more weep holes 92 are provided in the cupped planetary gear 28 that permit oil to lubricate the interface between the planetary gear 28 and the fixed sun gear 30 (not shown in FIG. 10A).

FIG. 10A illustrates the wearing surfaces 52 and seals located on the exterior of the spools 46, 48. The wearing surfaces 52 may be formed from, for example, hardened steel. FIG. 10B illustrates a end view of an elliptical body 22 according to one aspect of the invention. The elliptical body 22 may include one or more voids 94 that can be used to provide balance to the elliptical body 22. The outermost regions (along the long axis of the elliptical body 22) may include seals 96. The seals 96 form a substantially airtight seal between the elliptical bodies 22 and the pocket 20/housing 4. In addition, as seen in FIG. 2, seal members 31 and 33 are disposed in the surface of housing 4 so as to form a substantially airtight seal between the intake/compression side and the combustion/exhaust side of the housing 4. In this regard, there is substantially no intermingling of gases between the five regions of the engine (e.g., regions 100, 110, 120, 130, and 140 in FIG. 1).

As explained above, in one aspect of the invention, the housing 4, when viewed in cross-section, has a profile of a spline curve. Tables 1 and 2 reproduced below illustrates the radius of the internal surface of the housing 4 at 2° increments through 180° (the measurements for the remaining 180° are not included because the symmetrical nature of the housing 4). Radius measurements are provided for an interference fit between the elliptical bodies 22 as well for a running fit. The running fit includes an approximate clearance of 0.002 inches between the elliptical bodies 22 and the interior of the housing 4. The measurements assume a 1.5 inch minor axis and 3 inch major axis for the elliptical bodies 22. The radius of the rotor 12 is assumed to be 7.5 inches and the radius of the centers of the elliptical bodies 22 is assumed at 7 inches.

TABLE 1

| Degree | Running | Interference Fit | Degree | Running | Interference Fit |
|---|---|---|---|---|---|
| 0 | 7.7520" | 7.7500" | 48 | 8.3088" | 8.3068" |
| 2 | 7.7680 | 7.7660 | 50 | 8.3265 | 8.3245 |
| 4 | 7.7878 | 7.7858 | 52 | 8.3430 | 8.341 |
| 6 | 7.8110 | 7.8090 | 54 | 8.3596 | 8.3576 |
| 8 | 7.8345 | 7.8325 | 56 | 8.3749 | 8.3729 |
| 10 | 7.8596 | 7.8576 | 58 | 8.3896 | 8.3876 |
| 12 | 7.8854 | 7.8834 | 60 | 8.4032 | 8.4012 |
| 14 | 7.9120 | 7.9100 | 62 | 8.4160 | 8.4140 |
| 16 | 7.9376 | 7.9356 | 64 | 8.4278 | 8.4258 |
| 18 | 7.9638 | 7.9618 | 66 | 8.4385 | 8.4365 |
| 20 | 7.9893 | 7.9873 | 68 | 8.4482 | 8.4462 |
| 22 | 8.0148 | 8.0128 | 70 | 8.4574 | 8.4554 |
| 24 | 8.0408 | 8.0388 | 72 | 8.4659 | 8.4639 |
| 26 | 8.0665 | 8.0645 | 74 | 8.4734 | 8.4714 |

TABLE 1-continued

| Degree | Running | Interference Fit | Degree | Running | Interference Fit |
|---|---|---|---|---|---|
| 28 | 8.0909 | 8.0889 | 76 | 8.4799 | 8.4779 |
| 30 | 8.1153 | 8.1133 | 78 | 8.4856 | 8.4836 |
| 32 | 8.1392 | 8.1372 | 80 | 8.4905 | 8.4885 |
| 34 | 8.1625 | 8.1605 | 82 | 8.4948 | 8.4928 |
| 36 | 8.1853 | 8.1833 | 84 | 8.4984 | 8.4964 |
| 38 | 8.2075 | 8.2055 | 86 | 8.5002 | 8.4982 |
| 40 | 8.2294 | 8.2274 | 88 | 8.5013 | 8.4993 |
| 42 | 8.2500 | 8.2480 | 90 | 8.5020 | 8.5000 |
| 44 | 8.2703 | 8.2683 | | | |
| 46 | 8.2902 | 8.2882 | | | |
| 48 | 8.3088 | 8.3068 | | | |

TABLE 2

| Degree | Running | Interference Fit | Degree | Running | Interference Fit |
|---|---|---|---|---|---|
| 92 | 8.5013" | 8.4993" | 142 | 8.2075" | 8.2055" |
| 94 | 8.5002 | 8.4982 | 144 | 8.1853 | 8.1833 |
| 96 | 8.4984 | 8.4964 | 146 | 8.1625 | 8.1605 |
| 98 | 8.4948 | 8.4928 | 148 | 8.1392 | 8.1372 |
| 100 | 8.4905 | 8.4885 | 150 | 8.1153 | 8.1133 |
| 102 | 8.4856 | 8.4836 | 152 | 8.0909 | 8.0889 |
| 104 | 8.4799 | 8.4779 | 154 | 8.0665 | 8.0645 |
| 106 | 8.4734 | 8.4714 | 156 | 8.0408 | 8.0388 |
| 108 | 8.4659 | 8.4639 | 158 | 8.0148 | 8.0128 |
| 110 | 8.4574 | 8.4554 | 160 | 7.9893 | 7.9873 |
| 112 | 8.4482 | 8.4462 | 162 | 7.9638 | 7.9618 |
| 114 | 8.4385 | 8.4365 | 164 | 7.9374 | 7.9354 |
| 116 | 8.4278 | 8.4258 | 166 | 7.9120 | 7.9100 |
| 118 | 8.4160 | 8.4140 | 168 | 7.8856 | 7.8836 |
| 120 | 8.4032 | 8.4012 | 170 | 7.8596 | 7.8576 |
| 122 | 8.3896 | 8.3876 | 172 | 7.8345 | 7.8325 |
| 124 | 8.3749 | 8.3729 | 174 | 7.8110 | 7.8090 |
| 126 | 8.3596 | 8.3576 | 176 | 7.7878 | 7.7858 |
| 128 | 8.3430 | 8.3410 | 178 | 7.7680 | 7.7660 |
| 130 | 8.3265 | 8.3245 | 180 | 7.7520 | 7.7500 |
| 132 | 8.3088 | 8.3068 | | | |
| 134 | 8.2902 | 8.2882 | | | |
| 136 | 8.2703 | 8.2683 | | | |
| 138 | 8.2500 | 8.2480 | | | |
| 140 | 8.2294 | 8.2274 | | | |

During operation of the engine 2, as the elliptical body 22 clears the inlet 6 or intake port, the air/fuel charge follows behind and fills the intake sweep (i.e., region 100 in FIG. 1). Typically, with the optional compressor 8, the air/fuel charge will be pressurized at about two atmospheres. The air/fuel charge then enters the compression region of the engine (i.e., region 110 in FIG. 1). Near top-dead center, in the combustion chamber region 120 shown in FIG. 1, which is bounded by the space between the elliptical body 22 and the pocket 20, the air/fuel charge is ignited by the ignition source 60 carried by the rotor 12. In one aspect of the invention, the ignition source 60 is ignited prior to the elliptical body 22 reaching top-dead center (e.g., early ignition) to accommodate ignition advance. In this regard, when the combustion gases are exposed to the driving region 130, it is well on the way to total combustion and optimum driving pressure. After the power stroke, the combustion gases are exhausted outside of the space between the rotor 12 and housing 4 via the outlet 10.

It should be noted that the building pressure in the confined area does not work against the engine 2 as in a conventional piston engine. With reference to the lower right elliptical body 22, after completion of the power stroke, the elliptical body 22 actually aids in expelling combustion gases from the engine 2 via the outlet 10. This occurs for each elliptical body 22 (e.g., three in a preferred embodiment of the invention), thereby producing the same number of power strokes per revolution as a conventional six cylinder, four stroke piston-based engine.

The present engine 2 can be used in any applications where combustion engines are typically used, for example, automobiles and planes. The engine 2 may be used in hydrogen-powered applications. Multiple rotors 12 can also be used to increase the output of the engine 2. The present engine 2 produces motion which is entirely concentric and thus is in dynamic balance. There is no flip-flop motion associated with the rotor 12 as is present, for example, in the Wankel-type rotary combustion engines. The present engine 2 is able to rotate at high rates, for example, between about 25,000 and 50,000 RPM. This compares favorable with piston engines which revolve at a rate between about 4,000 and 6,000 RPM.

The practical RPM of the engine 2 will be very high, similar to that of a turbine. In addition there is little bypass of gases. The very long torque arm will generate high torque and the long swept volume will cause the complete combustion of the fuel, leaving a very clean, cool exhaust. It is estimated that the engine 2 can offer an 18% increase in efficiency over a modern reciprocating engine.

While embodiments of the present invention have been shown and described, various modifications may be made without departing from the scope of the present invention. The invention, therefore, should not be limited, except to the following claims, and their equivalents.

What is claimed is:

1. A method for operating an internal combustion rotary engine, the engine comprising (1) a housing having an internal surface which is substantially symmetrical about a minor-axis centerline of said housing, an inlet disposed on one side of the minor-axis centerline of the housing, and an outlet disposed on an opposing side of the minor-axis centerline of the housing; and (2) a rotor assembly concentrically mounted in the housing in relation to the inner surface of the housing, and a rotational axis of the rotor assembly being substantially perpendicular to the minor-axis centerline of the housing and a major-axis centerline of the housing, the rotor assembly comprising (a) a rotatable rotor comprising (i) a rotor shaft, (ii) a substantially solid circumferential surface, and (iii) a plurality of pockets located about the circumference of the rotor, a center of each respective one of the plurality of pockets being located substantially equidistant from the center of the rotor, (b) a rotatable elliptical body having a substantially solid outer surface and disposed in each of the plurality of pockets, each elliptical body being mounted to the rotor such that an axis of rotation of the elliptical body is centrally located at the center of the pocket, each rotatable elliptical body having a drive shaft that is coupled to an elliptical body driving mechanism that causes the elliptical body to rotate about its axis of rotation in correspondence with rotation of the rotor, wherein, when the elliptical body is rotated about its axis, the outer surface of the elliptical body engages the inner surface of the housing, and a portion of the outer surface nearest the vertices along a major-axis of each elliptical body engages a surface of the respective pocket in which the elliptical body is mounted, and wherein, as the rotor rotates concentrically within the housing through one revolution, each elliptical body rotates correspondingly through two revolutions about its axis, and the elliptical body, by engaging the inner surface of the housing and the pocket during the rotation, causes a first increase in volumetric displacement in an intake region, a corresponding first decrease in volumetric displacement in a compression region, a second increase in volumetric displacement in a power stroke region, and a corresponding second decrease in volumetric displacement in an exhaust region, the method comprising:

introducing a fuel/air mixture into an intake side of the housing, via the housing inlet, between a first one of the elliptical bodies passing the inlet and a second one of the elliptical bodies passing the inlet;

compressing the fuel/air mixture by rotating the rotor and the second elliptical body until the fuel/air mixture is compressed within the pocket of the second elliptical body between the surface of the pocket and the surface of the second elliptical body;

igniting the compressed fuel/air mixture within the pocket of the second elliptical body;

burning the ignited fuel/air mixture in a combustion side of the housing in a chamber formed between the second elliptical body and the inner surface of the housing so as to power the rotation of the rotor; and exhausting the burned fuel/air mixture from the housing via the outlet after the second elliptical body passes the outlet.

2. An internal combustion rotary engine comprising:

a housing having an internal surface which is substantially symmetrical about a minor-axis centerline of said housing, an inlet disposed on one side of the minor-axis centerline of the housing, and an outlet disposed on an opposing side of the minor-axis centerline of the housing; and a rotor assembly concentrically mounted in the housing in relation to the inner surface of the housing, and a rotational axis of the rotor assembly being substantially perpendicular to the minor-axis centerline of the housing and a major-axis centerline of the housing, the rotor assembly comprising:

a rotatable rotor comprising a rotor shaft, a substantially solid circumferential surface, and a plurality of pockets located about the circumference of the rotor, a center of each respective one of the plurality of pockets being located substantially equidistant from the center of the rotor;

a rotatable elliptical body having a substantially solid outer surface and disposed in each of the plurality of pockets, each elliptical body being mounted to the rotor such that an axis of rotation of the elliptical body is centrally located at the center of the pocket, each rotatable elliptical body having a drive shaft that is coupled to an elliptical body driving mechanism that causes the elliptical body to rotate about its axis of rotation in correspondence with rotation of the rotor, wherein, when the elliptical body is rotated about its axis, the outer surface of the elliptical body engages the inner surface of the housing, and a portion of the outer surface nearest the vertices along a major-axis of each elliptical body engages a surface of the respective pocket in which the elliptical body is mounted, and wherein, as the rotor rotates concentrically within the housing through one revolution, each elliptical body rotates correspondingly through two revolutions about its axis, and the elliptical body, by engaging the inner surface of the housing and the pocket during the rotation, causes a first increase in volumetric displacement in an intake region, a corresponding first decrease in volumetric displacement in a compression region, a second increase in volumetric displacement in a power stroke region, and a corresponding second decrease in volumetric displacement in an exhaust region.

3. The internal combustion rotary engine of claim 2, wherein the rotor includes three pockets located about its circumference.

4. The internal combustion rotary engine of claim 3, wherein the three pockets have an equal angular spacing about the center of the rotor.

5. The internal combustion rotary engine of claim 2, further comprising an ignition device disposed in each pocket.

6. The internal combustion rotary engine of claim 5, wherein the rotor is coupled to a distributor, and the distributor includes an electrical contact for each ignition device.

7. The internal combustion rotary engine of claim 2, wherein the elliptical body driving mechanism comprises a planet gear connected to the drive shaft of the elliptical body, and a sun gear engaging the planet gear concentrically mounted about the rotor shaft.

8. The internal combustion rotary engine of claim 7, wherein each plant gear has a pitch diameter equal to the pitch diameter of the sun gear.

9. The internal combustion rotary engine of claim 2, further comprising an output shaft mechanically geared with the rotor shaft.

10. The internal combustion rotary engine of claim 9, wherein the rotor shaft is mechanically coupled to the output shaft via a jack shaft.

11. The internal combustion rotary engine of claim 2, further comprising an exhaust gas purge port disposed in the plurality of pockets in the rotor.

12. The internal combustion rotary engine of claim 2, further comprising a compressor coupled to the inlet of the housing.

13. The internal combustion rotary engine of claim 2, wherein each elliptical body includes a seal substantially disposed on the exterior surface nearest the vertices along a major axis of the elliptical body.

14. The internal combustion rotary engine of claim 2, wherein each elliptical body is interposed between two outer circular members.

15. The internal combustion rotary engine of claim 2, wherein in the intake and compression regions, a fuel/air mixture is introduced into the inlet of the housing and is compressed by the rotation of the elliptical body into a combustion chamber defined by the surface of the pocket and the outer surface of the elliptical body.

16. The internal combustion rotary engine of claim 15, wherein the fuel/air mixture compressed within the combustion chamber defined by the surface of the pocket and the surface of the elliptical body is ignited by the ignition device.

17. The internal combustion rotary engine of claim 16, wherein in the power stroke and exhaust regions, the ignited fuel/air mixture is burned and then exhausted through the outlet of the housing.

18. The internal combustion rotary engine of claim 2, wherein the rotor shaft includes a passageway therein in communication with a bore contained in the drive shaft of the elliptical body, as a path of lubrication.

19. The internal combustion rotary engine of claim 2, further comprising a first seal member in the housing surface located along the minor-axis centerline of the housing between the inlet and the outlet, and a second seal member in the housing surface substantially opposed to the first seal member along the minor-axis centerline of the housing, said first and second seal members engaging with the circumferential surface of the rotor and the surface of each elliptical body so as to form an intake/compression chamber on the inlet side of the housing, and a combustion/exhaust chamber on the outlet side of the housing.

20. The internal combustion rotary engine of claim 2, wherein the inner surface of the housing has a substantially epitrochoid-like shape.

* * * * *